United States Patent
Ung et al.

(10) Patent No.: US 6,694,000 B2
(45) Date of Patent: Feb. 17, 2004

(54) PREPAID REAL-TIME WEB BASED REPORTING

(75) Inventors: Dara Ung, Odenton, MD (US); Mark Titus, Arnold, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 113 days.

(21) Appl. No.: 09/832,016

(22) Filed: Apr. 11, 2001

(65) Prior Publication Data

US 2003/0069816 A1 Apr. 10, 2003

Related U.S. Application Data

(60) Provisional application No. 60/196,100, filed on Apr. 11, 2000.

(51) Int. Cl.[7] .............................................. H04M 15/00
(52) U.S. Cl. ................... 379/114.2; 379/114.01; 379/114.03; 379/114.15; 379/114.16; 379/114.17; 379/144.01
(58) Field of Search ...................... 379/114.01, 114.03, 379/114.05, 114.15, 114.16, 114.17, 114.18, 114.19, 114.2, 121.04, 122, 144.01, 144.06, 144.08; 455/406, 408

(56) References Cited

U.S. PATENT DOCUMENTS

| | | | | |
|---|---|---|---|---|
| 5,353,335 A | * | 10/1994 | D'Urso et al. | 379/114.2 |
| 5,506,893 A | * | 4/1996 | Buscher et al. | 379/114.01 |
| 5,673,306 A | * | 9/1997 | Amadon et al. | 455/405 |
| 5,692,037 A | * | 11/1997 | Friend | 379/114.01 |
| 5,905,736 A | * | 5/1999 | Ronen et al. | 370/546 |
| 6,115,458 A | * | 9/2000 | Taskett | 379/144.01 |
| 6,335,968 B1 | * | 1/2002 | Malik | 379/114.2 |
| 6,356,630 B1 | * | 3/2002 | Cai et al. | 379/144.01 |
| 6,381,316 B2 | * | 4/2002 | Joyce et al. | 379/114.2 |
| 6,396,913 B1 | * | 5/2002 | Perkins, III | 379/112.01 |
| 6,483,907 B1 | * | 11/2002 | Wong et al. | 379/114.01 |

* cited by examiner

Primary Examiner—Curtis Kuntz
Assistant Examiner—Quoc D Tran
(74) Attorney, Agent, or Firm—William H. Bollman

(57) ABSTRACT

Near real time Internet access of prepaid call history and replenishment data is provided via an Internet browser separate from the prepaid device to a user (e.g., the subscriber), allowing a subscriber to access call history and/or replenishment information nearly in real time (e.g., within a minute of the expense/credit) without requiring assistance from a customer service representative. A web based prepaid report page retrieves call history and/or replenishment information from the subscriber's service provider, and displays the same through a web browser for review by the subscriber. The requested call history and/or replenishment information may be bounded by date, date and time, or even within specific time range(s) within each day in a given range of days. The web based prepaid report page may also link the user to a replenishment application for the subscriber, to assist the subscriber in replenishing their account after having reviewed their call history and prepaid account status in near real time. The call history and account balance information is preferably updated in near real time after the completion of a call, which is then accessed by the web based prepaid report page. Substantially immediately after a prepaid call is ended, the web based prepaid reporting application formulates a Call Detail Record (CDR) and sends it over a TCP/IP link to the web based prepaid reporting application, which stores the CDR in a local database. Then, a user may access this CDR/RR information in near real time, after appropriate log-in with, e.g., a user ID of the subscriber (e.g., MIN number based), and perhaps a password. Once the requested information is entered, the web based prepaid reporting application queries its local database, formats an appropriate response to the user's request, and presents the call history and/or replenishment information to the web browser of the user.

26 Claims, 4 Drawing Sheets

PrePaid Call History and Replenishment Web access

PrePaid Call History and Replenishment Web access

Exemplary Web Based Prepaid Report Page

PREPAID REAL-TIME WEB BASED REPORTING

This application claims the benefit of provisional application No. 60/196,100 filed on Apr. 1, 2000.

BACKGROUND OF THE INVENTION

1. Field of the Invention

This invention relates generally to wireless carriers, Internet service providers (ISPs), and information content delivery services/providers. More particularly, it relates to access to prepaid account call history applications and replenishment applications.

2. Background of Related Art

In recent years, the telecommunication industry has seen an explosive growth both in the number of the types of services offered and in the number of service providers. Among those numerous services now being offered, prepaid call service may be one of the fastest growing segments in the telecommunication industry today.

As the name implies, a prepaid call service allows a customer of the service to pay in advance for the use of the provider's network resources in making a telephone call. The prepaid call service provides, among other things, an alternative option for a telephone user who might otherwise not be able to obtain the traditional postpaid telephone services because, e.g., of a bad credit rating, or of being in a geographical area where post paid service is unavailable.

The world-wide prepaid call services market is projected to grow tremendously in the next few years, fueling a frenzy among service suppliers to quickly add prepaid service to the list of services they already offer. Conventionally, however, the addition of a new service such as prepaid typically requires the addition of new network equipment geared to handle such new service.

For example, as shown FIG. 4, an originator 501 attempts to initiate a prepaid call to a destination 502. Such a prepaid call service typically requires a service platform 503 to "rate" the prepaid account of the originator 501 to determine whether the originator 501 has a sufficient balance to place the call. If sufficient balance is available, the prepaid service platform 503 connects (or bridges) the call between the originator 501 and the destination 502 via the public switch telephone network (PSTN) 504. The prepaid service platform 503 may also provide additional information to the originator 501, such as account balance information and/or options for replenishment of the same.

Unfortunately, all existing access systems for call history information and replenishment applications have significant delays, typically within 24 hours, and often require customer care representatives of the relevant service provider.

There is a need for a technique and architecture which provides near real-time (e.g., within minutes, preferably less than 1 minute) access to a wireless subscriber for call history and replenishment information.

SUMMARY OF THE INVENTION

In accordance with the principles of the present invention, a method of retrieving prepaid service related information comprises accessing from an Internet terminal a web based prepaid reporting application. An identity of a particular subscriber is input to a web based prepaid report page. The prepaid service related information is retrieved through a web browser.

BRIEF DESCRIPTION OF THE DRAWINGS

Features and advantages of the present invention will become apparent to those skilled in the art from the following description with reference to the drawing, in which.

DETAILED DESCRIPTION OF ILLUSTRATIVE EMBODIMENTS

The present invention provides near real time Internet access of prepaid call history and replenishment data to a subscriber without requiring assistance from a customer service representative. Conventional prepaid call history and replenishment records are not provided in near real time (e.g., within a few minutes, preferably in less than 1 minute of a last call completion).

The present invention provides a technique and apparatus which utilizes a web page to receive and display call history information for the subscriber. The web page may also provide replenishment records and a replenishment application, to assist the subscriber after having reviewed their call history and prepaid account status in near real time, to replenish their account.

The call history and account balance information is preferably updated in near real time after the completion of a call, which in terms of the amount of time that it might take a subscriber to actually log on to an Internet based account status web page is essentially real time if they are not using their wireless device at the same time. Thus, the near real time delay between call completion or replenishment, and the time at which that last call or replenishment application updates at the web based account status web page for that particular subscriber, is preferably less than 30 seconds.

In accordance with the principles of the present invention, substantially immediately after a prepaid call is ended, the prepaid application formulates the Call Detail Record (CDR) and sends it over the TCP/IP link to the Web Gateway application. The Web Gateway application stores the CDR in the database.

When the subscriber accesses the call history web page, the subscriber's user ID and password are prompted. Once the requested information is entered, the Web Gateway application queries the database, formats the output and presents to the subscriber the most recent call history logs. The same procedure is applied to a Replenishment Record (RR).

Figure 1:
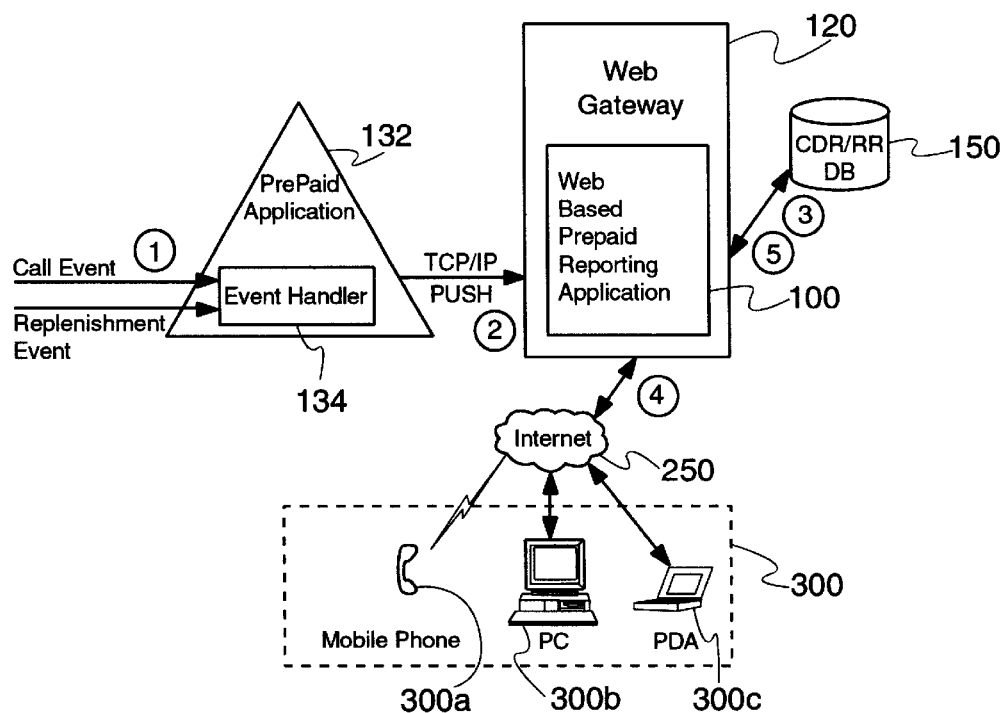
FIG. 1 shows an exemplary network architecture enabling prepaid call history and replenishment Internet access, in accordance with the principles of the present invention.

FIG. 1 shows an exemplary network architecture enabling prepaid call history and replenishment Internet access, in accordance with the principles of the present invention.

In particular, as shown in FIG. 1, a prepaid subscriber ends a call in progress or has just performed a replenishment of the account. The Event Handler module of the prepaid application detects the event and formulates the CDR or RR to be sent (pushed) to the Web Gateway application.

As indicated by operation 1 in FIG. 1, the CDR and RR are sent over the TCP/IP link to the Web Gateway Application.

Operation 2 in FIG. 1 shows that upon reception of the CDR or R, a web gateway stores the record in a suitable database using, e.g., the subscriber's Mobile Identification Number (MIN) as an index key.

A suitable web gateway is a Wireless Internet Gateway (WIG), shown and described in co-pending U.S. application Ser. No. 09/630,762, filed Aug. 2, 2000, entitled "Wireless Internet Gateway", by Richard Smith, the entirety of which is expressly incorporated herein by reference.

Figure 3:
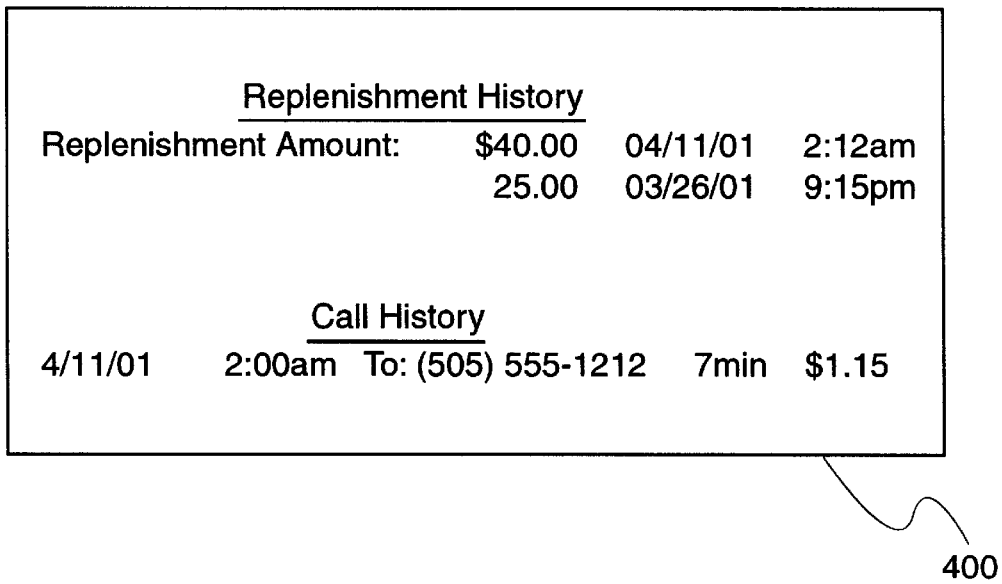
FIG. 3 shows an exemplary web based prepaid report page, in accordance with the principles of the present invention.
Figure 4:
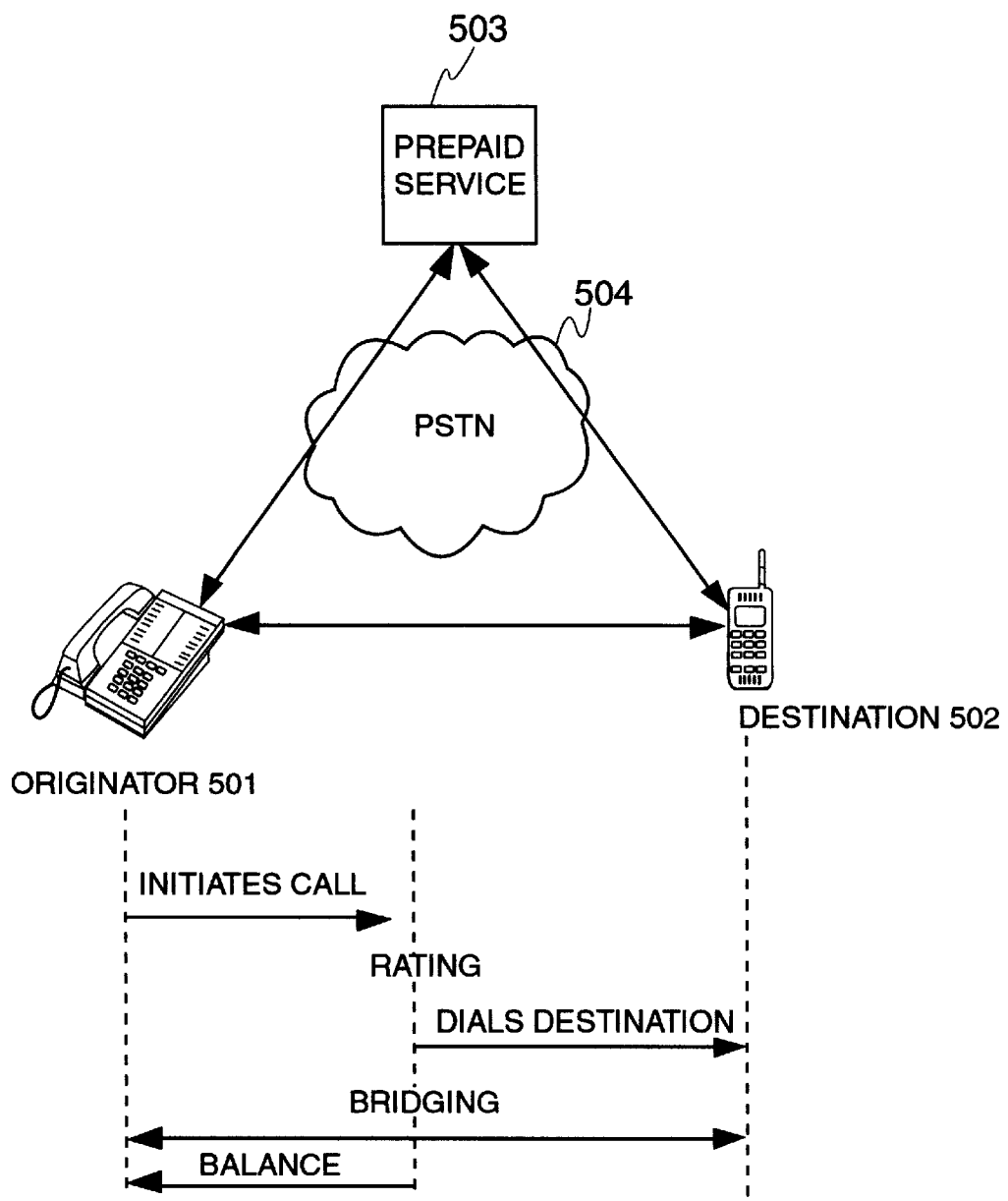
FIG. 4 shows relevant portions of a conventional telephone service network including a prepaid call service.

Operation 3 in FIG. 3 depicts a prepaid subscriber or customer care representative logging-in to the provisioned web page of an appropriate website. In the disclosed embodiment, the web page is viewd on the monitor of an appropriately provisioned personal computer (PC) having Internet access, though any hand-held device capable of Internet access may be used. Moreover, in the disclosed embodiments, the Internet access is performed through a device other than the relevant wireless device.

Authentication in the form of user identification and password may be performed during operation 3.

Once the subscriber is properly logged-in to the web based prepaid report page, access is granted to the subscriber. At that point, the subscriber (or subscriber representative such as another family member) may specify specific search criteria for retrieval of call and/or replenishment history information.

For instance, call history alone may be desired, or replenishment history alone may be desired, either or both of which may be displayed as a response through the web page.

Alternatively or additionally, a date range may be submitted to form the basis for retrieval of date-specific call and/or replenishment history information.

Moreover, commensurate with the near real time nature of the available call and/or replenishment history, a time range may be submitted in addition to a date request to further refine the retrieved information to exactly that which is desired by the logged-in subscriber.

For instance, a subscriber may wish to see the rate ascribed to calls recently made (e.g., over the past hour). To do so, the subscriber need only log-in to the web based prepaid report page, submit a history request ranging from an hour before the present time, to the present time. In response, the web server hosting the prepaid real time web based prepaid reporting application 100 (e.g., the web gateway 120) will provided a much narrowed down call and/or replenishment history for the wireless device having the relevant MIN.

In operation 4 of FIG. 1, the web based prepaid reporting application 100 of the web gateway 120 retrieves the CDR and/or RR from the database 150 based on the desired filtered range of information designated by the subscriber through the web based prepaid report page.

In the disclosed embodiment, the web based prepaid reporting application formats the retrieved CDR and/or RR for the appropriate recipient (e.g., a PC 300b, a PDA 300c, a wireless phone 300a, etc.), and transmits the same for presentation to the user.

Figure 2:
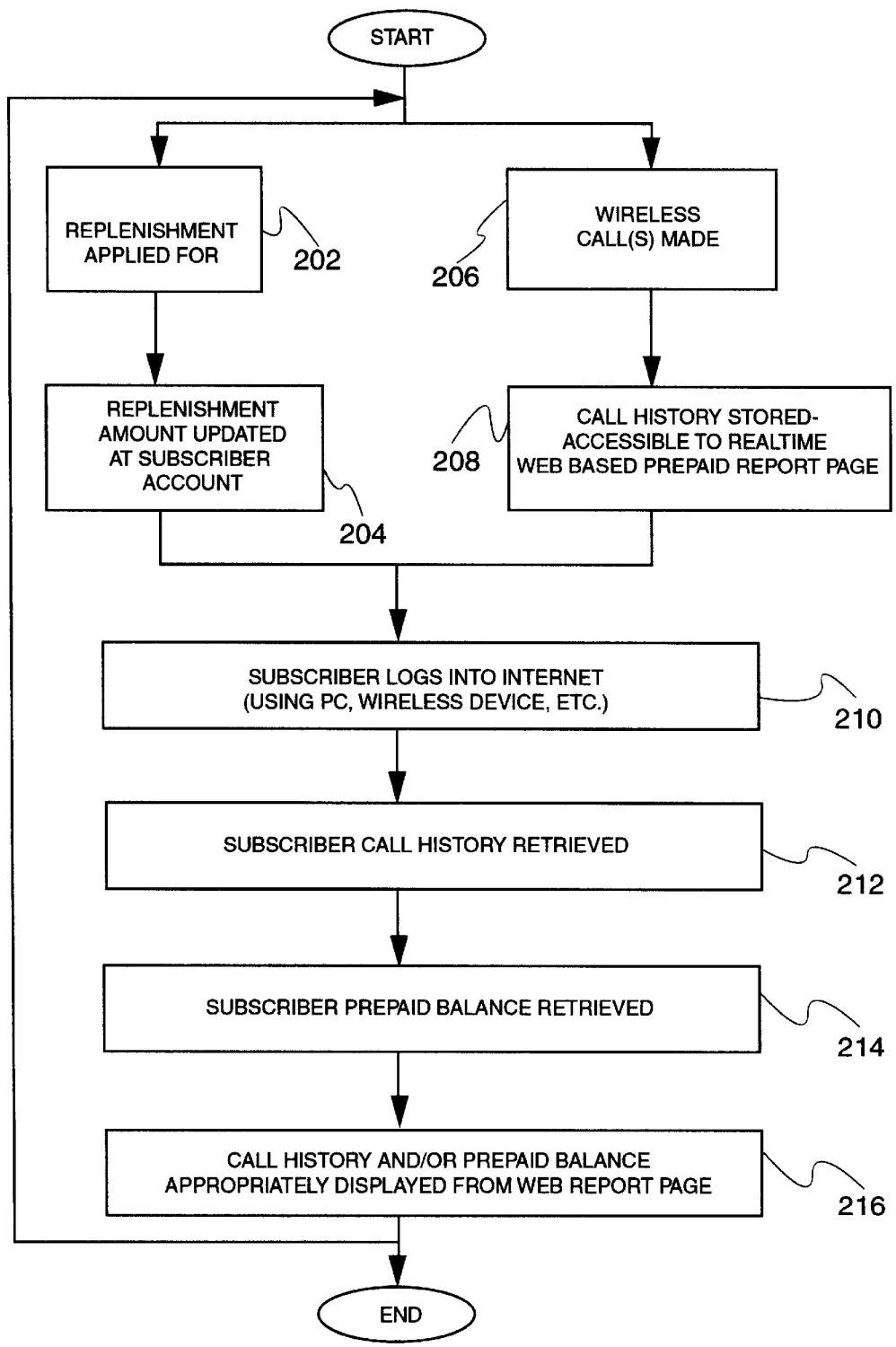
FIG. 2 shows an exemplary process of updating call history and/or replenishment information and presenting the same to a relevant wireless subscriber in near real time via a web based prepaid report page, in accordance with the principles of the present invention.

FIG. 2 shows an exemplary process of updating call history and/or replenishment information and presenting the same to a relevant wireless subscriber in near real time via a web based prepaid report page, in accordance with the principles of the present invention.

In particular, as shown in steps 202 and 204 of FIG. 2, replenishment funding may be applied for by a subscriber in otherwise conventional manners, and approved replenishment amounts may be updated with the subscriber's account in an appropriate subscriber information database.

In steps 206 and 208, prepaid calls may be made (step 206) and call history information may be stored in appropriate subscriber call logs in an appropriate database of the relevant service provider.

In step 210, the user logs into the web based prepaid reporting application 100 via the Internet. The user (e.g., the subscriber) may use any appropriate Internet device capable of browsing the web based prepaid report page 400. In the disclosed embodiment, the web based prepaid reporting application formats the web based prepaid report page 400 for viewing primarily on the monitor of a PC, e.g., using HTML or other suitable web language. However, custom formats for other browsers are within the scope of the present invention, e.g., for viewing on a PDA device 300c, or even for viewing on the display of a mobile phone 300a.

Step 212 depicts the retrieval of subscriber call history information by the web based prepaid reporting application from an appropriate call history database for the subscriber.

Similarly, step 214 shows the retrieval of prepaid account balance information from the service providers subscriber account database.

Both steps 212 and 214 may be limited or filtered by appropriate parameters set by the user (e.g., a date range and/or time range).

Step 216 shows that the retrieved information is transmitted from the web gateway 120 to the user's Internet device 300.

FIG. 3 shows an exemplary web based prepaid report page, in accordance with the principles of the present invention.

The principles of the present invention have applicability for usage with wireless intelligent network (WIN) applications, e.g., by the integration of a prepaid application with an Internet gateway application. Moreover, a web based prepaid reporting application such as that shown and described herein can reduce expenses and/or cut overhead costs to service providers by reducing or even eliminating the need for customer care representative intervention in checking call history and/or replenishment history information for a particular subscriber.

The requested prepaid service related information may be bounded simply by dates, by dates and specific times on each of those dates, or even by specific time ranges during each day within a specific range of days (e.g., during business hours only for each day in the requested range).

While the invention has been described with reference to the exemplary embodiments thereof, those skilled in the art will be able to make various modifications to the described embodiments of the invention without departing from the true spirit and scope of the invention.

What is claimed is:

1. A method of obtaining prepaid service related information, comprising:
   accessing from an Internet terminal a web based prepaid reporting application;
   passing call event information from a prepaid application over a Transmission control protocol/Internet protocol (TCP/IP) connection to said web-based prepaid reporting application;
   inputting to a web based prepaid report page an identity of a particular subscriber; and
   retrieving prepaid service related information through a web browser in near real time from when a user last used a prepaid service.

2. The method of obtaining prepaid service related information according to claim 1, wherein:

said Internet terminal is not a device for which prepaid service related information is being retrieved.

3. The method of obtaining prepaid service related information according to claim 1, wherein:

said subscriber is identified to said web based prepaid report page with a mobile identification number (MIN).

4. The method of obtaining prepaid service related information according to claim 1, wherein:

said prepaid service related information includes call history information relating to said subscriber.

5. The method of obtaining prepaid service related information according to claim 1, wherein:

said prepaid service related information includes replenishment history information relating to said subscriber.

6. The method of obtaining prepaid service related information according to claim 1, wherein:

said prepaid service related information includes call history information and replenishment history information relating to said subscriber.

7. The method of obtaining prepaid service related information according to claim 1, further comprising:

bounding requested prepaid service related information by a date range input to said web based prepaid report page.

8. The method of obtaining prepaid service related information according to claim 7, further comprising:

further bounding said requested prepaid service related information by a time of day of each day bounding said date range.

9. The method of obtaining prepaid service related information according to claim 1, further comprising:

bounding requested prepaid service related information by a time range within a specific day.

10. The method of obtaining prepaid service related information according to claim 1, further comprising:

bounding requested prepaid service related information by a range of days, and by a range of time specific to each day in said range of days.

11. The method of obtaining prepaid service related information according to claim 1, further comprising:

retrieving said prepaid service related information from a server local to said web based prepaid reporting application.

12. The method of obtaining prepaid service related information according to claim 1, wherein:

said call event information is a call detail record.

13. The method of obtaining prepaid service related information according to claim 1, wherein:

said call event information is a replenishment record.

14. Apparatus for obtaining prepaid service related information, comprising:

means for accessing from an Internet terminal a web based prepaid reporting application;

means for passing call event information from a prepaid application over a Transmission control protocol/Internet protocol (TCP/IP) connection to said web-based prepaid reporting application;

means for inputting to a web based prepaid report page an identity of a particular subscriber; and means for retrieving said prepaid service related information through a web browser in near real time from when a user last used a prepaid service.

15. The apparatus for obtaining prepaid service related information according to claim 14, wherein:

said Internet terminal is not a device for which prepaid service related information is being retrieved.

16. The apparatus for obtaining prepaid service related information according to claim 14, wherein:

said subscriber is identified to said web based prepaid report page with a mobile identification number (MIN).

17. The apparatus for obtaining prepaid service related information according to claim 14, wherein:

said prepaid service related information includes call history information relating to said subscriber.

18. The apparatus for obtaining prepaid service related information according to claim 14, wherein:

said prepaid service related information includes replenishment history information relating to said subscriber.

19. The apparatus for obtaining prepaid service related information according to claim 14, wherein:

said prepaid service related information includes call history information and replenishment history information relating to said subscriber.

20. The apparatus for obtaining prepaid service related information according to claim 14, further comprising:

bounding requested prepaid service related information by a date range input to said web based prepaid report page.

21. The apparatus for obtaining prepaid service related information according to claim 20, further comprising:

further bounding said requested prepaid service related information by a time of day of each day bounding said date range.

22. The apparatus for obtaining prepaid service related information according to claim 14, further comprising:

bounding requested prepaid service related information by a time range within a specific day.

23. The apparatus for obtaining prepaid service related information according to claim 14, further comprising:

bounding requested prepaid service related information by a range of days, and by a range of time specific to each day in said range of days.

24. The apparatus for obtaining prepaid service related information according to claim 14, wherein:

said means for retrieving retrieves said prepaid service related information from a server local to said web based prepaid reporting application.

25. The apparatus for obtaining prepaid service related information according to claim 14, wherein:

said call event information is a call detail record.

26. The apparatus for obtaining prepaid service related information according to claim 14, wherein:

said call event information is a replenishment record.

* * * * *

UNITED STATES PATENT AND TRADEMARK OFFICE
CERTIFICATE OF CORRECTION

PATENT NO. : 6,694,000 B2
APPLICATION NO. : 09/832016
DATED : February 17, 2004
INVENTOR(S) : Ung It is certified that error appears in the above-identified patent and that said Letters Patent is hereby corrected as shown below:

Insert into

"(56) References Cited" Section:

--5,740,534, 4/1998, Ayerst et al.
  6,266,614, 7/2001, Alumbaugh
  5,673,306, 9/1997, Amadon et al.
  6,148,198, 11/2000, Anderson et al.
  5,579,372, 11/1996, Astrom
  5,943,399, 8/1999, Bannister et al.
  6,101,378, 8/2000, Barabash et al.
  6,148,197, 11/2000 Bridges et al.
  6,226,529, 5/2001, Bruno et al.
  5,950,130, 9/1999, Coursey
  5,974,054, 10/1999, Couts et al.
  6,122,503, 9/2000, Daly
  5,802,492, 9/1998, DeLorme et al.
  6,289,373, 9/2001, Dezonno
  6,075,982, 6/2000, Donovan et al.
  5,692,037, 11/1997, Friend
  6,198,431, 3/2001, Gibson
  6,199,045, 3/2001 Giniger et al.
  6,169,891, 1/2001, Gorham et al.
  6,181,935, 1/2001, Gossman et al.
  6,317,594, 11/2001, Gossman et al.
  5,768,509, 6/1998, Gunluk
  6,223,046, 4/2001, Hamill-Keays et al.
  6,035,025, 3/2000, Hanson
  6,058,000, 5/2000, Hanson
  5,953,398, 9/1999, Hill
  5,797,094 8/1998, Houde et al.
  5,822,700, 10/1998, Hult et al.
  5,987,323, 11/1999, Huotari
  4,706,275, 11/1987, Kamil
  5,828,740, 10/1998, Khuc et al.
  5,592,535, 1/1997, Klotz
  5,351,235, 9/1994, Lahtinen
  5,978,685, 11/1999, Laiho
  6,188,752, 2/2001, Lesly
  6,173,181, 1/2001, Losh

UNITED STATES PATENT AND TRADEMARK OFFICE
CERTIFICATE OF CORRECTION

PATENT NO.        : 6,694,000 B2
APPLICATION NO. : 09/832016
DATED              : February 17, 2004
INVENTOR(S)       : Ung It is certified that error appears in the above-identified patent and that said Letters Patent is hereby corrected as shown below:

"(56) References Cited" Section: (cont'd)

| | | |
|---|---|---|
| 5,797,096, | 8/1998, | Lupien et al. |
| 5,761,618, | 6/1998, | Lynch et al. |
| 5,068,891, | 11/1991, | Marshall |
| 6,327,479, | 12/2001, | Mikkola |
| 5,999,811, | 12/1999, | Molne |
| 6,064,875, | 5/2000, | Morgan |
| 6,249,744, | 6/2001, | Morita |
| 6,070,067, | 5/2000 | Nguyen et al. |
| 6,049,710, | 4/2000, | Nilsson |
| 6,149,353, | 11/2000, | Nilsson |
| 5,774,533, | 6/1998, | Patel |
| 6,369,913, | 5/2002, | Perkins, III |
| 6,208,854, | 3/2001, | Roberts et al. |
| 5,905,736, | 5/1999, | Rohen et al. |
| 5,628,051, | 5/1997, | Salin |
| 5,682,600, | 10/1997, | Salin |
| 5,787,357, | 6/1998, | Salin |
| 5,946,629, | 8/1999, | Sawyer et al. |
| 5,920,821, | 6/1999, | Seaholtz et al. |
| 5,767,795, | 6/1998, | Schaphorst |
| 5,930,701, | 7/1999, | Skog |
| 5,794,142, | 8/1998, | Vanttila et al. |
| 5,806,000, | 9/1998, | Vo et al. |
| 6,122,520, | 9/2000, | Want et al. |
| 6,249,680, | 6/2001, | Wax et al. |
| 6,081,508, | 6/2000, | West et al. |
| 5,946,630, | 8/1999, | Willars et al. |
| 6,205,330, | 3/2001, | Winbladh |
| 5,797,091, | 8/1998, | Clise et al. |
| 5,343,493, | 8/1994, | Karimullah |
| 5,479,482, | 12/1995, | Grimes |
| 5,519,403, | 5/1996, | Bickley et al. |
| 5,535,434, | 7/1996, | Siddoway et al. |
| 4,891,638, | 1/1990, | Davis |
| 5,070,329, | 12/1991, | Jasinaki |
| 5,068,656, | 11/1991, | Sutherland |
| 5,119,104, | 6/1992, | Heller |
| 5,177,478, | 1/1993, | Wagai et al. |

UNITED STATES PATENT AND TRADEMARK OFFICE
CERTIFICATE OF CORRECTION

PATENT NO. : 6,694,000 B2
APPLICATION NO. : 09/832016
DATED : February 17, 2004
INVENTOR(S) : Ung It is certified that error appears in the above-identified patent and that said Letters Patent is hereby corrected as shown below:

"(56) References Cited" Section: (cont'd)

| | | |
|---|---|---|
| 5,363,425, | 11/1994, | Mufti et al. |
| 5,387,993, | 2/1995, | Heller et al. |
| 5,485,163, | 1/1996, | Singer et al. |
| 5,479,408, | 12/1995, | Will |
| 5,497,149, | 3/1996, | Fast |
| 5,513,243, | 4/1996, | Kage |
| 5,588,009, | 12/1996, | Will |
| 5,604,486, | 2/1997, | Lauro et al. |
| 5,606,313, | 2/1997, | Allen et al. |
| 5,614,890, | 3/1997, | Fox |
| 4,494,119, | 1/1985, | Wimbush |
| 4,651,156, | 3/1987, | Martinez |
| 4,891,650, | 1/1990, | Sheffer |
| 5,014,206, | 5/1991, | Scribner et al. |
| 5,055,851, | 10/1991, | Sheffer |
| 5,208,756, | 5/1993, | Song |
| 5,218,367, | 6/1993, | Sheffer et al. |
| 5,223,844, | 6/1993, | Mansell et al. |
| 5,289,527, | 2/1994, | Tiedemann, Jr. |
| 5,293,642, | 3/1994, | Lo |
| 5,379,451, | 1/1995, | Nakagoshi et al. |
| 5,347,568, | 9/1994, | Moody et al. |
| 5,374,936, | 12/1994, | Feng |
| 5,390,339, | 2/1995, | Bruckert et al. |
| 5,394,158, | 2/1995, | Chia |
| 5,398,190, | 3/1995, | Wortham |
| 5,406,614, | 4/1995, | Hara |
| 5,423,076, | 6/1995, | Westergreen et al. |
| 5,432,841, | 7/1995, | Rimer |
| 4,952,928, | 8/1990, | Carrol et al. |
| 5,214,789, | 5/1993, | George |
| 5,266,944, | 11/1993, | Carrol et al. |
| 5,325,302, | 6/1994, | Izidon et al. |
| 5,361,212, | 11/1994, | Class et al. |

UNITED STATES PATENT AND TRADEMARK OFFICE
CERTIFICATE OF CORRECTION

PATENT NO. : 6,694,000 B2
APPLICATION NO. : 09/832016
DATED : February 17, 2004
INVENTOR(S) : Ung It is certified that error appears in the above-identified patent and that said Letters Patent is hereby corrected as shown below:

"(56) References Cited" Section: (cont'd)

| | | |
|---|---|---|
| 5,381,338 , | 1/1995, | Wysocki et al. |
| 5,369,227, | 3/1995, | Carroll et al. |
| 5,418,537, | 5/1995; | Bird |
| 5,434,789, | 7/1995, | Fraker et al. |
| 5,461,390, | 10/1995, | Hoshen |
| 5,470,233, | 11/1995, | Fuchterman et al. |
| 5,485,161, | 1/1996, | Vaughn |
| 5,488,563, | 1/1996, | Chazelle et al. |
| 5,508,931, | 4/1996, | Snider |
| 5,515,287, | 5/1996, | Hakoyama et al. |
| 5,532,690, | 7/1996, | Hertel |
| 5,539,398, | 7/1996, | Hall et al. |
| 5,552,772, | 9/1996, | Janky et al. |
| 5,568,119, | 10/1996, | Schipper et al. |
| 5,574,648, | 11/1996, | Pilley |
| 5,606,850, | 3/1997, | Nakamura |
| 5,610,815, | 3/1997, | Gudat et al. |
| 5,615,116, | 3/1996, | Gudat et al. |
| 5,621,793, | 4/1997, | Bednarak et al. |
| 5,235,630, | 8/1993, | Moodey et al. |
| 5,543,776, | 8/1996, | L'Esperance et al. |
| 5,633,912, | 5/1997, | Tsoi |
| 5,454,024, | 9/1995, | Lebowitz |
| 5,334,974, | 8/1994, | Simms et al. |
| 5,299,132, | 3/1994, | Wortham |
| 5,193,215, | 3/1993, | Olmer |
| 5,144,283, | 9/1992, | Arens et al. |
| 5,555,286, | 9/1996, | Tendler |
| 5,388,147, | 2/1995, | Grimes |
| 5,081,667, | 1/1992, | Drori et al. |
| 1,103,073, | 7/1914, | O'Connel |
| 5,043,736, | 8/1991, | Darnell et al. |
| 5,161,180, | 11/1992, | Chavous |

UNITED STATES PATENT AND TRADEMARK OFFICE
CERTIFICATE OF CORRECTION

| | |
|---|---|
| PATENT NO. | : 6,694,000 B2 |
| APPLICATION NO. | : 09/832016 |
| DATED | : February 17, 2004 |
| INVENTOR(S) | : Ung |

It is certified that error appears in the above-identified patent and that said Letters Patent is hereby corrected as shown below:

"(56) References Cited" Section: (cont'd)

5,239,570,   8/1993,   Koster et al.--

Signed and Sealed this

Twelfth Day of June, 2007

JON W. DUDAS
*Director of the United States Patent and Trademark Office*